United States Patent [19]
Biemelt et al.

[11] Patent Number: 5,941,208
[45] Date of Patent: Aug. 24, 1999

[54] PROCESS FOR OPERATING AN OTTO INTERNAL-COMBUSTION ENGINE HAVING AN INTERNAL MIXTURE FORMATION

[75] Inventors: Andreas Biemelt, Ludwigshafen; Christian Enderle, Baltmannsweiler; Stephan Krämer, Leutenbach; Klaus Rössler, Altbach; Bernd Baur, Esslingen; Peter Hohner, Leinfelden-Echterdingen; Gunter Karl, Esslingen; Roland Kemmler, Stuttgart, all of Germany

[73] Assignee: Daimler-Benz Aktiengesellschaft, Stuttgart, Germany

[21] Appl. No.: 08/964,029

[22] Filed: Nov. 4, 1997

[30] Foreign Application Priority Data

Nov. 4, 1996 [DE] Germany ............ 196 45 383

[51] Int. Cl.⁶ .................................. F02P 15/00
[52] U.S. Cl. .................. 123/295; 123/169 CL; 123/298
[58] Field of Search ............ 123/169 CL, 295, 123/298, 305

[56] References Cited

U.S. PATENT DOCUMENTS

| | | | |
|---|---|---|---|
| 5,170,760 | 12/1992 | Yamada et al. | ............... 123/295 |
| 5,335,635 | 8/1994 | Kadoi et al. | ............... 123/305 X |
| 5,724,938 | 3/1998 | Yamada | ............... 123/305 |

FOREIGN PATENT DOCUMENTS

| | | |
|---|---|---|
| 0 451 829 | 10/1991 | European Pat. Off. . |
| 0 491 381 | 6/1992 | European Pat. Off. . |
| 0 538 890 | 4/1993 | European Pat. Off. . |

*Primary Examiner*—Tony M. Argenbright
*Attorney, Agent, or Firm*—Evenson, McKeown, Edwards & Lenahan P.L.L.C.

[57] ABSTRACT

Otto internal-combustion engines having one injector respectively per cylinder for the internal mixture formation can be operated at full load or high partial load by fuel injection in the suction stroke of the piston and, at medium or low partial load, with a compression stroke injection. The compression stroke injection, which is advantageous in this load range, because of low average combustion space temperatures and the tendency to form deposits in the combustion space because of residues of liquid fuel and the resulting impaired operating conditions, can partially be carried out only to a limited degree. In order to provide a process for operating an Otto internal-combustion engine of the above-mentioned type which permits an arbitrary operating period in the medium or low load range, it is provided that, in the operation of the internal-combustion engine with a compression stroke injection, as a function of the time or at least of an operating parameter, independently of the momentary load requirement, a change-over takes place to a suction stroke injection while simultaneously reducing the intake air quantity and, after the conclusion of a certain free-burning interval, a switching-back takes place into the operating mode with the compression stroke injection.

20 Claims, 6 Drawing Sheets

PROCESS FOR OPERATING AN OTTO INTERNAL-COMBUSTION ENGINE HAVING AN INTERNAL MIXTURE FORMATION

BACKGROUND AND SUMMARY OF THE INVENTION

This application claims the priority of German Patent Document No. 196 45 383.6-13, the disclosure of which is expressly incorporated by reference herein.

The invention relates to a process for operating an Otto internal-combustion engine having an internal mixture formation, the point in time and the injection quantity of the respective fuel injection being changeable as a function of the load requirement of the internal-combustion engine 1 by means of an electronic control unit and the required fuel quantity being injected at a full load or high partial load in the suction stroke and at a medium or low partial load in the compression stroke of the piston into the cylinder.

The injection of the fuel quantity required for the internal mixture formation in the case of Otto internal-combustion engines preferably takes place by means of one injector respectively per cylinder in the compression stroke of the piston, in which case the late point in time of the injection permits a charge stratification in the case of which, while the overall mixture formation is lean, in the proximity of the ignition source, a rich, easily inflammable fuel/air mixture is provided. As the result of the stratified-charge operation of the internal-combustion engine with the compression stroke injection, a comparatively low fuel consumption and a reduction of the pollutant emissions can be achieved in the medium and low partial load range of the internal-combustion engine. The maximal power output of the internal-combustion engine is lower in the stratified-charge operation than during a homogeneous mixture formation so that, at full load or at a high partial load, an operating process with a fuel injection in the suction stroke of the piston is advantageous. German Patent Document DE-OS 43 24 642 A1 therefore suggests a directly injecting internal-combustion engine which operates with a charge stratification in the low-load range and with a homogenous mixture formation in the high-load range. The known internal-combustion engine has an electronic control unit which, as a function of the momentary load requirement of the internal-combustion engine, determines the point in time of the injection and the injection quantity of the respective fuel injection by the corresponding control of an injector and also controls the point in time of the ignition.

Lower gas temperatures occur during an operation of the internal-combustion engine with a late internal mixture formation by fuel injection in the compression stroke than in the case of a fuel injection during the suction stroke and a therefore homogeneous mixture formation so that, as the operating time increases during the stratified-layer operation, deposits occur on those surfaces in the cylinders which are wetted with liquid fuel during the injection. If such deposits occur on the injector nozzle, this may lead to changes of the spray pattern and can disadvantageously change the mixture formation conditions and the combustion conditions. Furthermore, deposits on the spark plug particularly on its electrodes, cause ignition problems since, starting from a certain degree of coking, the resistance of the spark plug is reduced to such an extent that the remaining voltage offered by an ignition system will no longer be larger than the break-through voltage required for generating a spark. If ignition failures occur because of a coking of the spark plug; that is, the forming of the ignition spark and therefore the mixture ignition does not take place in the concerned working cycle of the cylinder, the fuel consumption will increase and the pollutant emission will also rise as a result of unburned hydrocarbons. In the high-load operation of the internal-combustion engine with a homogeneous mixture burning by fuel injection during the suction stroke, the deposits are prevented by far higher gas temperatures and the deposits are also removed which formed during a preceding low-load operation. The known internal-combustion engine can be operated in the partial-load range only for short periods of time which are limited by the occurrence of ignition failures because of coking of the spark plug or by a deficient mixture formation because of deposits on the injector nozzle. It therefore cannot meet the requirements occurring in practice, specifically the longer operating duration in the lower partial-load range.

It is therefore an object of the invention to provide a process for operating an Otto internal-combustion engine of the above-mentioned type having an internal mixture formation, which permits an arbitrary operating duration in the medium or low load range without disadvantageous effects on the combustion quality.

According to the invention, this object is achieved by providing an engine operating process of the kind referred to above, wherein the operation of the internal-combustion engine 1 with a compression stroke injection, as a function of the time or at least one operating parameter, the control unit 6 changes over, independently of the momentary load requirement 13, to the suction stroke injection with a simultaneous reduction of the intake air quantity and, after the conclusion of a certain free-burning interval ($t_{Fr}$), switches back into the operating mode with the compression stroke injection.

The change-over, which is independent of the momentary load requirement, from the operation of the internal-combustion engine with a compression stroke injection to a suction stroke injection, corresponding to the duration of the working interval to the switching-back to the compression stroke injection, causes a short-term mixture burning at high temperatures. In this case, the deposits created by the wetting with liquid fuel are thermally decomposed and, in particular, the injector nozzle and the spark plug of each cylinder are burnt free so that their optimal function is ensured. The change-over of the point in time of the injection by the electronic control unit takes place as a function of an operating parameter of the internal-combustion engine, in which case the operating intervals with the compression stroke injection with the resulting achievable advantages with respect to the fuel consumption and the pollutant emissions are as long as possible. The change-over of the operating mode in each case takes place as late as possible but in time before a damaging influence on the combustion quality by the extent of the deposits. During the change-over to the suction stroke injection and homogeneous mixture formation, the amount of intake air is simultaneously reduced so that the load point or the power output of the internal-combustion engine is the same before and after the change-over of the points in time of the injection. By means of a slightly increased injection quantity as in the stratified-charge operation in the case of the compression stroke injection and a high excess of intake air, as a result of the throttling of the rate of flow of the intake air, the homogeneous mixture formation is possible in the case of a suction stroke injection and under stoichiometric air conditions. After the expiration of the working interval for the burning-free, in addition to shifting the point in time of the injection into the compression stroke, the flow rate of the intake air is also increased in order to switch back into the stratified-charge operation with the required λ-values.

Advantageously, an input quantity is fed to the control unit which is determined from an operating parameter. The control unit compares the fed input quantity with a predeterminable parameter and, in the case of a conformity, causes the change-over of the operating mode from the compression stroke injection to the suction stroke injection. After the conclusion of the working interval for the burning-free, the switch-back takes place. The parameters may be filed in a characteristic diagram and are taken out by the control unit for the momentary load point of the internal-combustion engine.

In advantageous further developments of the invention, the input quantity is continuously generated by a timer. In this case, the parameter determines an operating interval with a compression stroke injection which is maximally possible in the present load point of the internal-combustion engine and in which the extent of the formed deposits does not influence the optimal function of the internal-combustion engine. After the expiration of the respective operating interval; that is, in the case of a conformity of the input quantity generated by the timer and the parameter, the change-over takes place to the homogeneous mixture formation and a removal of the deposits by a burning-free at high gas temperatures.

In a further advantageous development of the invention, an operating parameter of the internal-combustion engine with information on the momentary combustion quality is determined as the input quantity. An impairment of the combustion quality may occur as the result of a change of the spray pattern during the fuel injection or as the result of ignition failures because of deposits and coking on the injector nozzles or the spark plugs. Changes of the burning conditions and particularly the occurrence of ignition failures affect the quiet running of the internal-combustion engine so that a determination of an unquiet running is suitable as an operating parameter for generating the input quantity for the control unit. The quiet running of the internal-combustion engine can be determined by measuring the rotational speed on the rotating flywheel of the internal-combustion engine, in which case a change-over from the stratified-charge operation to the homogenous mixture formation takes place when a load-point-specific rotational speed is reached.

In a particularly advantageous embodiment of the invention, one electric testing voltage respectively is applied to the spark plugs projecting into the cylinders for the mixture ignition and a testing current is measured which in each case flows through the spark plug and which determines the quality of the input quantity for the control unit. After the application of a known testing voltage and measuring the current intensity of the flowing testing current, the electric resistance of the spark plug can be determined according to Ohm's law. Since the electric resistance of a spark plug clearly falls with an increasing degree of coking, the measuring of the testing current and the detection of the antiproportionally acting electric resistance of the spark plug, permit a conclusion with respect to the degree of coking. If, in the stratified-charge operation of the internal-combustion engine with a compression stroke injection, the testing current measured at the spark plug corresponds to a current intensity given by the parameter, the control unit will change over to a suction stroke injection. In the case of this control of the point in time of the change-over, it is particularly advantageous that the operating intervals with the compression stroke injection are maximally long because the optimal point in time of the change-over is in each case indicated shortly before the occurrence of ignition failures. The testing voltage is applied to the spark plug during a testing interval which, in the working play of the cylinder, is away from the point in time of the ignition at which an ignition voltage is applied to the spark plugs for triggering an ignition spark for the mixture ignition sparking over between the electrodes. Preferably, the spark plug diagnosis will take place by the application of a testing voltage and the measuring of the testing current during the exhaust stroke before the application of the ignition voltage. In this case, the testing voltage applied to the spark plugs is clearly lower than the sparkover voltage necessary for generating an ignition spark, whereby the mixture formation conditions and the combustion conditions are not influenced during the spark plug diagnosis. The spark plug diagnosis can be carried out by means of direct current or alternating current. Several admissions of voltage to the spark plug successively in a pulse-type manner are also conceivable.

The spark plug diagnosis by applying a testing voltage and a measurement of the respective flowing testing current, in view of a possibly different degree of coking, can be carried out on several spark plugs or even on each spark plug of the internal-combustion engine individually. In this case, the spark plug diagnosis takes place in the same crank angle area during the respective working play of the cylinders, whereby precise information can be obtained concerning the degree of coking of the respective spark plugs in comparison to one another and a change-over of the point in time of the injection and a subsequent switching back into the operating mode with the compression stroke injection can take place at the optimal point in time as a function of the load requirement.

Other objects, advantages and novel features of the present invention will become apparent from the following detailed description of the invention when considered in conjunction with the accompanying drawings.

DETAILED DESCRIPTION OF THE DRAWINGS

Figure 1:
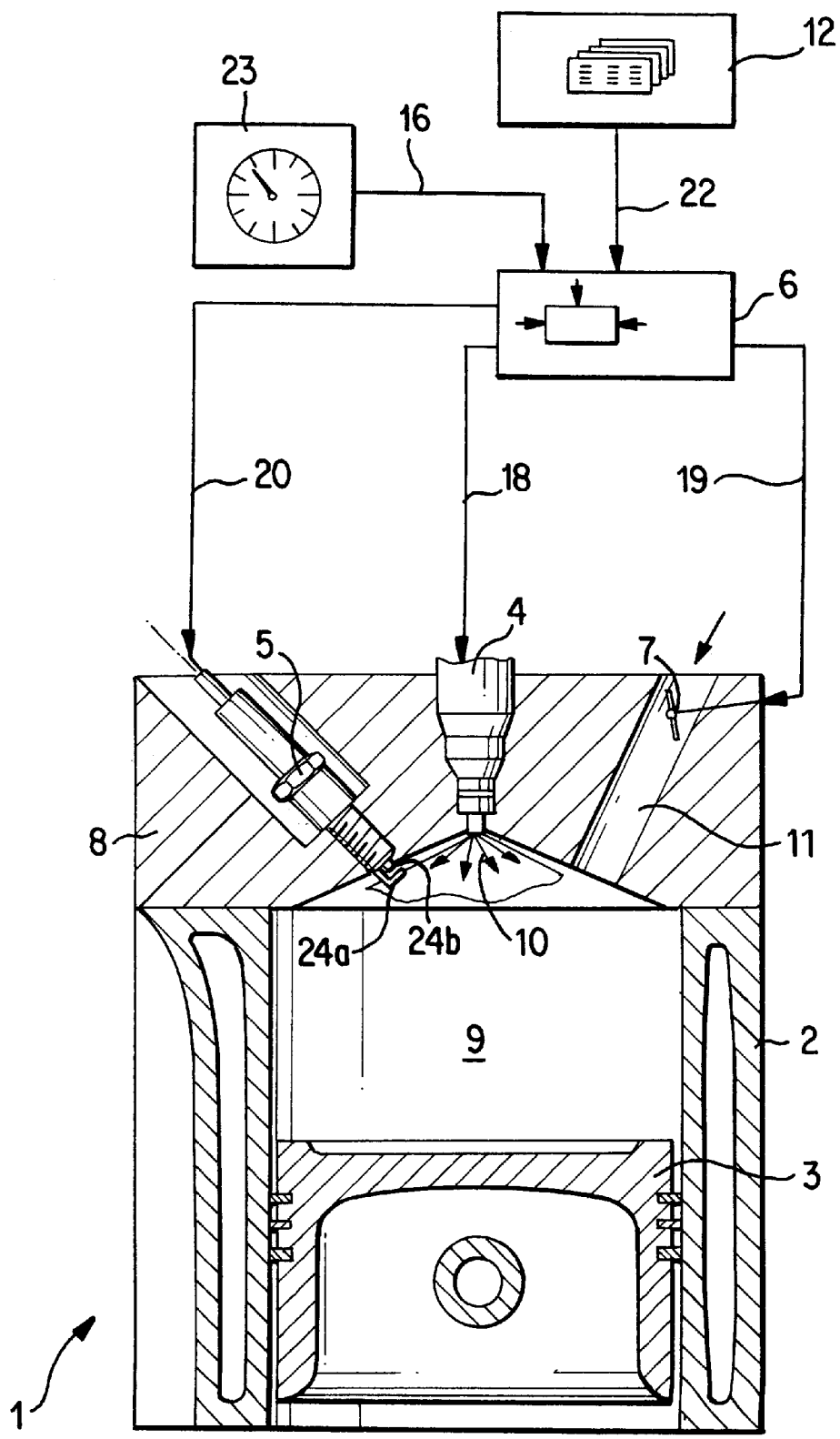
FIG. 1 is a partial sectional view of an internal-combustion engine with a timer indication of the change-over point of the operating modes with different points in time of the injection.
Figure 2:
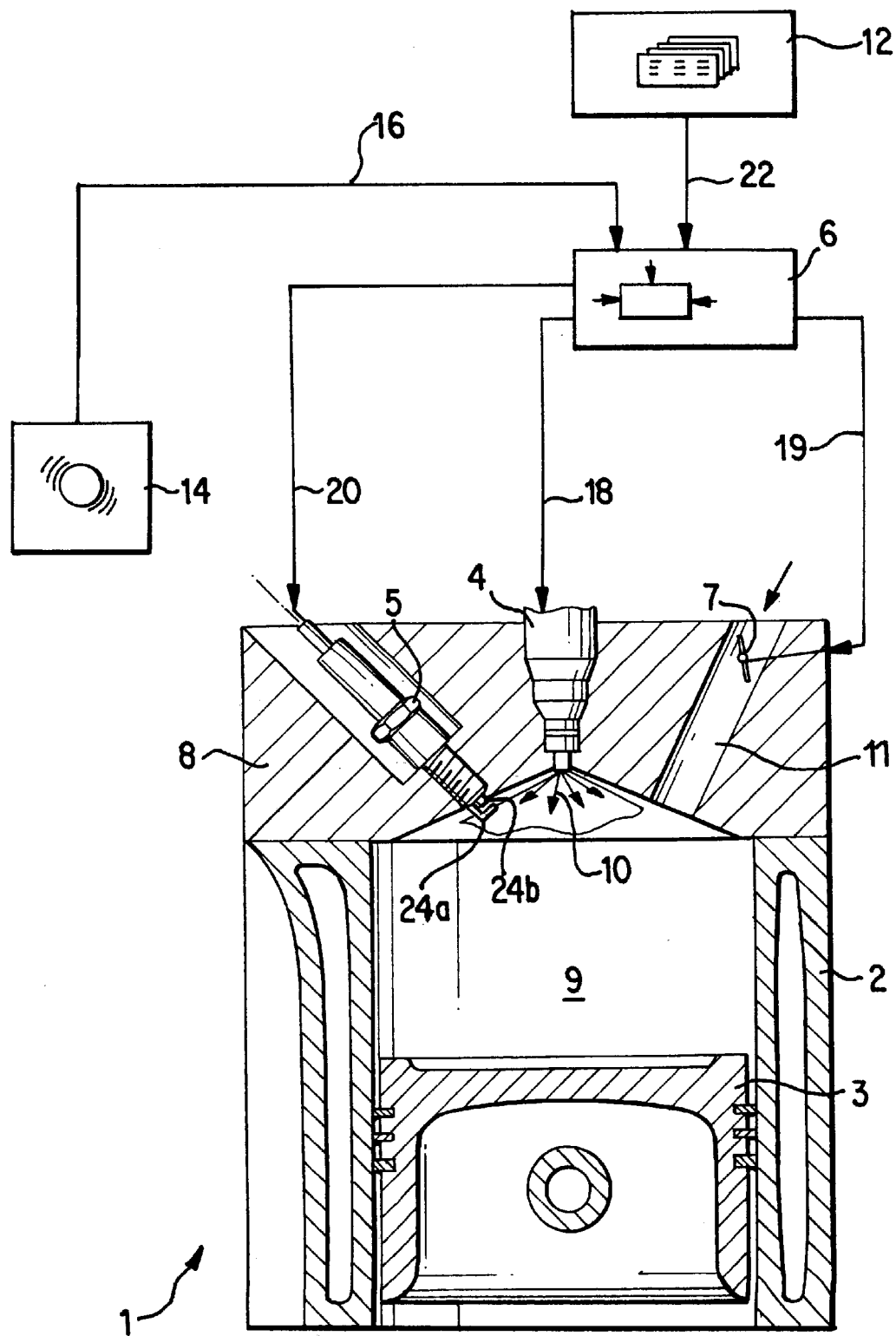
FIG. 2 is a representation of an internal-combustion engine according to FIG. 1 with a quiet-running indication of the change-over point.
Figure 3:
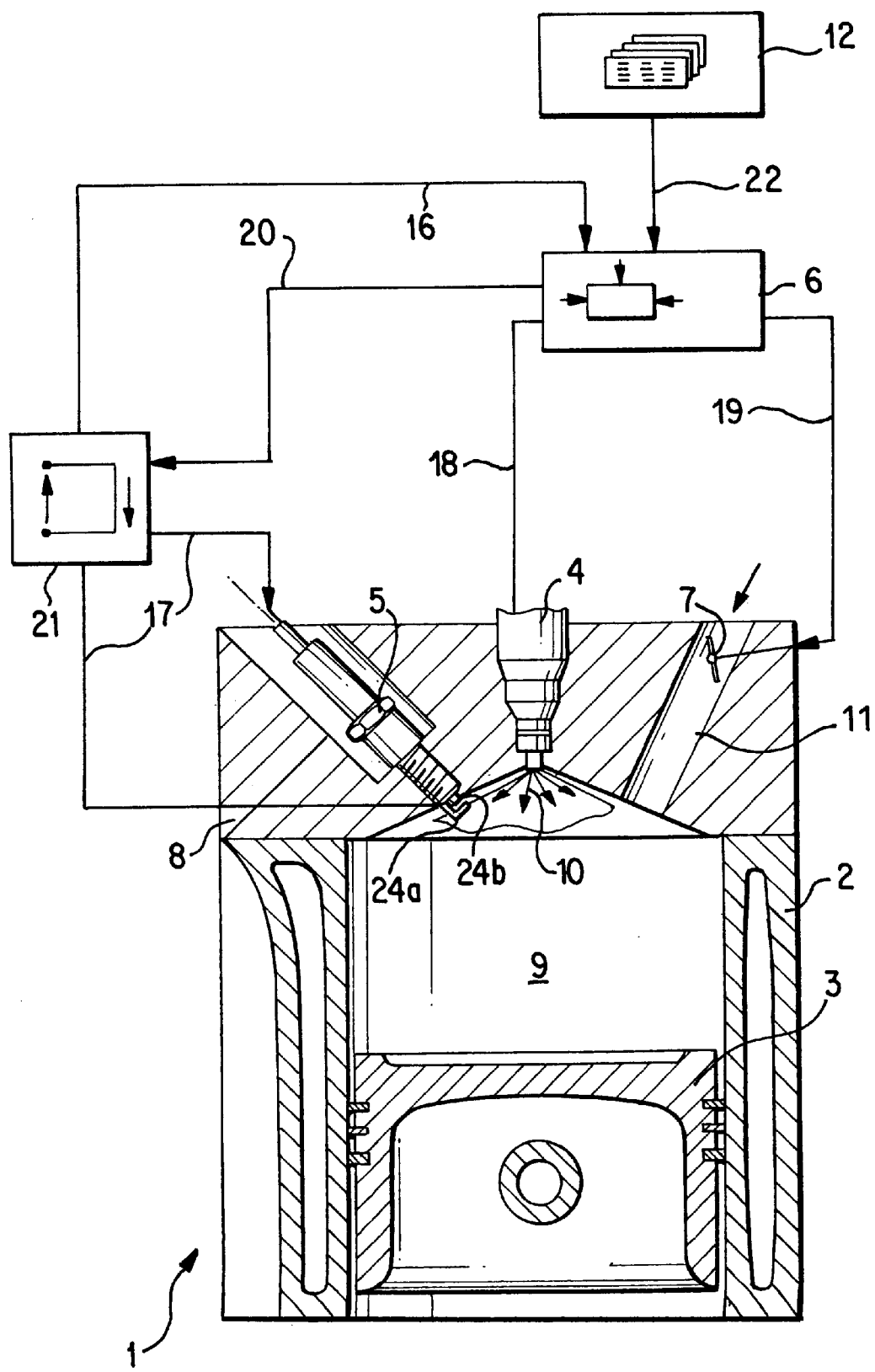
FIG. 3 is a representation according to FIG. 1 and FIG. 2 with a spark plug diagnosis indication of the change-over point.

FIGS. 1 to 3 each are longitudinal sectional views of a cylinder 2 of an internal-combustion engine 1. For reasons of clarity, the same reference numbers are in each case used for the same parts. In each cylinder 2 of the internal-combustion engine 1, a combustion space 9 is bounded by a piston 3 and a cylinder head 8, into which combustion space 9 an injector 4 penetrating the cylinder head 8 injects a conically expanding fuel spray 10. In the combustion space 9, an ignitable fuel/air mixture can be formed of the injected fuel and of the combustion air fed through an inlet port 11, which fuel/air mixture can be ignited by an ignition spark which sparks over between the electrodes 24a, 24b of a spark plug 5

As a function of the load requirement, the fuel injection takes place at a lower and medium partial load in the compression stroke of the piston 3 and at a high partial load and full load in the suction stroke of the piston 3. The mixture formation in the combustion space 9 and the ignition of the fuel/air mixture by the spark plug 5 are controlled by an electronic control unit 6. For this purpose, corresponding to the existing load point, the control unit supplies ignition parameters to the spark plug 5, injection parameters 18 to the injector and throttle parameters 19 to a throttle valve 7 controlling the inlet port 11, for providing the required intake air flow rate. The electrodes 24a, 24b of the spark plug 5 project so far into the combustion space 9 that, in the partial load area with the compression stroke injection and the stratified charge operation, the stratified mixture cone determined by the fuel spray 10 can be reliably ignited.

At a high partial load or full load, the internal-combustion engine 1 with the fuel injection operates in the suction stroke of the piston 3, in which case a homogeneous mixture formation takes place in the combustion space 9 and a high peak power is supplied. In the medium or low partial low range, the injection into the combustion space 9 takes place in the compression stroke of the piston 3, in which case a charge stratification is carried out by means of the air excess as the result of a high intake air flow rate through the inlet port 11 and the later point in time of the injection. In the stratified-layer operation, the fuel consumption is comparatively low and, in addition, the pollutant emissions, particularly $NO_x$, and CO, are reduced. In the case of the stratified combustion, the average gas temperature in the combustion space 9 is lower than in the case of the homogeneous combustion, whereby a residue-free combustion is inhibited. During a longer operating period with fuel injection in the compression stroke of the piston 3 shortly before the triggering of the ignition, deposits form on the surfaces in the combustion space 9 which are wetted by liquid fuel, which deposits, depending on the position and the extent, may affect the proper functioning of the internal-combustion engine 1. Thus, deposits on the injection nozzle of the injector 4 may lead to a change of the spray pattern of the injected fuel spray 10 and thus to a change of the mixture formation conditions and burning conditions. Coking of the spark plug 5 lowers its electric resistance and, starting from a certain degree of coking, the high voltage offered by the ignition system, because of a leakage current caused by the coking, will not reach the sparkover voltage required for the formation of an ignition spark and ignition failures are caused which result in a considerably higher fuel consumption and in a higher emission of unburnt hydrocarbons.

In order to limit the depositing of combustion residues in the stratified-charge operation, independently of the momentary load requirement, as a function of the time or at least one operating parameter from which information can be obtained with respect to the degree of coking in the combustion space 9, the control unit 6 switches from the fuel injection in the compression stroke of the piston 3 to the suction stroke injection. Simultaneously, the throttle valve 7 is positioned by corresponding throttle parameters 19 in order to guide the reduced intake air quantity required for the homogeneous mixture formation through the inlet port 11. While maintaining the load point of the internal-combustion engine, during the homogeneous combustion, the average gas temperature in the combustion space 9 is raised such that the deposits formed in the stratified-charge operation are removed and particularly the spark plug 5 and the injector 4 are burnt free. After the conclusion of a certain brief free-burning interval with the fuel injection in the suction stroke and a homogeneous mixture formation, with a burnt-free combustion space 9, a switching back take place into the operating mode of the internal-combustion engine 1 with the compression stroke injection.

Operating intervals with a compression stroke injection are endeavored which are as long as possible and the control unit 6 therefore does not switch over from the stratified combustion to the homogeneous combustion before harmful deposits are present. For this purpose, the control unit 6 receives an input signal 16 which originates from a timer or is determined from an operating parameter of the internal-combustion engine. The information of the input signal 16 is compared in the control unit 6 with a parameter 22 which is taken from a characteristic diagram 12 for the existing load point. The parameter 22 indicates the change-over point and, when there is conformity with the input signal 16, the control unit 6 initiates the short-term free-burning interval by the corresponding measures, such as the shifting of the point in time of the injection, the increase of the injection quantity and the reduction of the intake air flow by the positioning of the throttle valve 7 by means of the corresponding injection parameters 18 or throttle parameters 19 or ignition parameters 20.

In FIG. 1, the input signal 16 in the operation of the internal-combustion engine 1 with a compression stroke injection is generated by a timer 23. For the existing load point, the control unit 6 takes that parameter 22 from the characteristic diagram 12 which indicates the operating period with a stratified charge which is maximally possible in this operating point, after the exceeding of which a clear deterioration of the combustion quality must be expected because of the formation of deposits in the combustion space 9. After the conclusion of this operating interval, that is, in the case of a conformity of the input signal 16 which is generated by the timer 23 and indicates the elapsed operating time, with the parameter 22, the change-over to the suction stroke injection takes place. The duration of the free-burning interval and the switching-back, which concludes the free-burning, is also indicated by a conforming comparison of the input signal generated by the timer 23 with the pertinent parameter 22.

As illustrated in FIG. 2, the input signal 16 which is supplied to the control unit 6 for determining the change-over point can be determined from an operating parameter of the internal-combustion engine 1 which directly judges the combustion quality. In this case, the input signal 16 supplies to the control unit 6 information concerning the momentary quiet running of the internal-combustion engine 1 and is obtained from a rotating-time measurement on a rotating flywheel 14 of the internal-combustion engine 1. The quiet running of the internal-combustion engine 1 deteriorates with the occurrence of cycle fluctuations which may be caused by ignition problems because of a coking of the spark plug 5 in the stratified-layer operation. When a certain rotating time is reached which is indicated by the input signal 16 and which is known to the control unit 6 because of the parameter 22 taken from the characteristic diagram 12, the change-over of the operating mode takes place to a suction stroke injection for the free-burning of the combustion space 9. The switching-back to the compression stroke injection which concludes the free-burning interval is initiated by the control unit 6 in a time-controlled manner.

FIG. 3 illustrates an arrangement for the operating control of an internal-combustion engine 1 in the case of which the input signal which is supplied to the control unit 6 for determining the change-over point to the suction stroke injection is generated directly from the momentary degree of coking of the spark plug 5. In the same manner as the ignition voltage for triggering an ignition spark sparking over between the electrodes 24a, 24b of a spark plug 5, an ignition system 21 applies a testing voltage by way of a distributing line 17. In this case, the testing voltage is clearly lower than the breakthrough voltage required for generating an ignition spark and amounts to approximately 5 to 10 volt. It is preferably applied to the spark plug during the exhaust movement of the piston 3, thus clearly before the admission of the ignition voltage for triggering the ignition spark at the point in time of the ignition which is determined by the control unit 6 by the feeding of the corresponding ignition parameters 20 to the ignition system 21. As an alternative, the testing voltage can also be applied in the suction stroke and in the compression stroke of the piston 3.

After the application of the testing voltage, a testing current is measured which flows through the spark plug 5 and which analogously to Ohm's law depends on the electric resistance of the spark plug 5. Since coking of the spark plug 5 reduces the electric resistance, the electric resistance of the spark plug 5 will fall with an increasing extent of the coking and the measurable testing current will rise reciprocally. The quality of the input signal 16 is directly related to the current intensity of the measured testing current so that, based on the parameter 22 provided for the existing load point of the internal-combustion engine 1, the control unit 6 carries out a change-over to the suction stroke injection for the free burning precisely at the point in time in the stratified-charge operation as of which the ignition failures can be expected because of a coking of the spark plug 5. A switching-back to the compression stroke injection takes place at the conclusion of the free-burning interval after the control unit 6 has received an input signal 16 which contains the information concerning a sufficiently low testing current and thus it is certain that the coking is cleaned off the initially diagnosed spark plug 5. This electric spark plug diagnosis by applying a testing voltage permits an operation of the internal-combustion engine 1 with a maximally long operating interval with a compression stroke injection and the connected advantages, in which case the change-over to the suction stroke injection for the free-burning takes place in time before the first occurrence of ignition failures. The consequences of ignition failures, specifically an increased fuel consumption and an increased pollutant emission, particularly of $NO_x$, and CO, are therefore reliably avoided.

Figure 4:
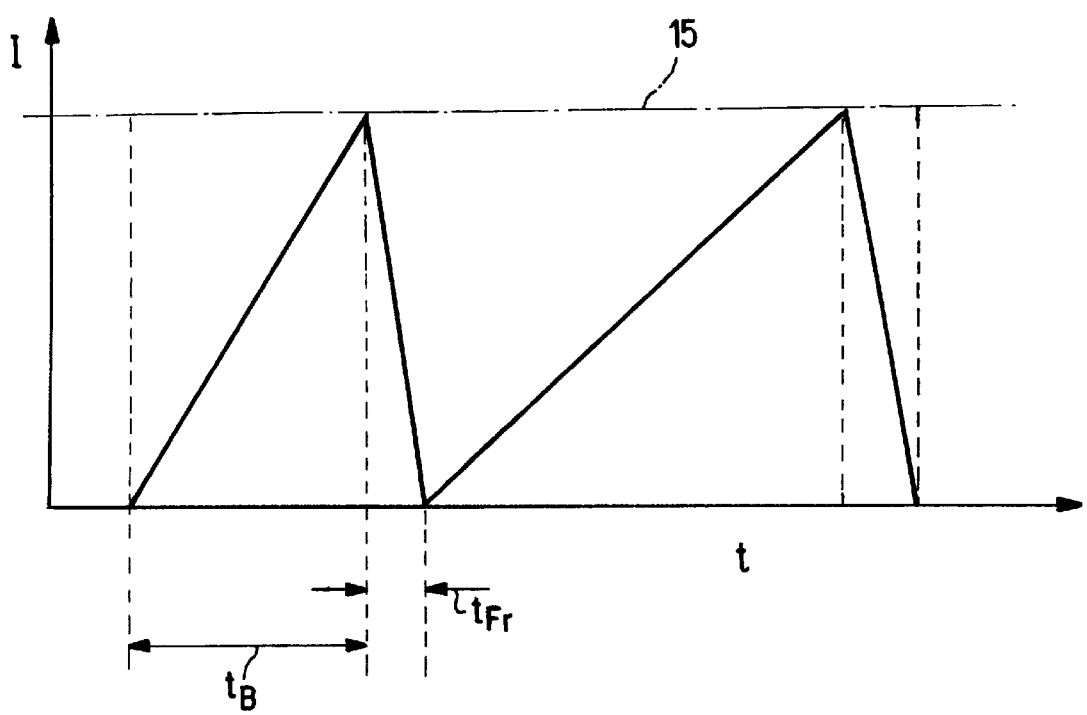
FIG. 4 is a diagrammatic representation of the testing current course during the spark plug diagnosis.

In a diagram, FIG. 4 graphically shows the course of the testing current I during the spark plug diagnosis as a function of the operating time t of the internal-combustion engine. In the operating interval $t_B$ with the suction stroke injection and the stratified charge, the current intensity I increases linearly with the operating time and the connected coking of the spark plug. If, in the operating interval $t_B$, when a constant testing voltage U is applied according to Ohm's law $U=R \times I$, because of the electric resistance R which decreases with the increasing degree of coking of the spark plug, the measured testing current I reaches an intensity as of which ignition failures must be expected, according to the invention, the change-over takes place to the suction stroke injection and the free-burning for a certain free-burning interval $t_{Fr}$. The diagram graphically shows by means of the failure limit 15 the current intensity I which indicates the change-over point. During the free-burning interval $t_{Fr}$ with the suction stroke injection, because of the high gas temperatures in the combustion space, the coking is removed and the electric resistance of the diagnosed spark plug will rise which, in the final spark plug diagnosis, is expressed in the form of the linearly falling testing current I. When, because of a correspondingly low testing current I, the completed removal of the deposits in the combustion space is indicated, the switching-back to the compression stroke injection takes place at the end of the free-burning interval $t_{Fr}$. In the subsequent operating interval, because the average combustion space temperatures are low again in the stratified-charge operation, deposits will form again so that, because the electric resistance of the diagnosed spark plug falls again, the measured testing current I will rise until a change-over must again take place to the suction stroke injection and the free-burning.

Figure 5:
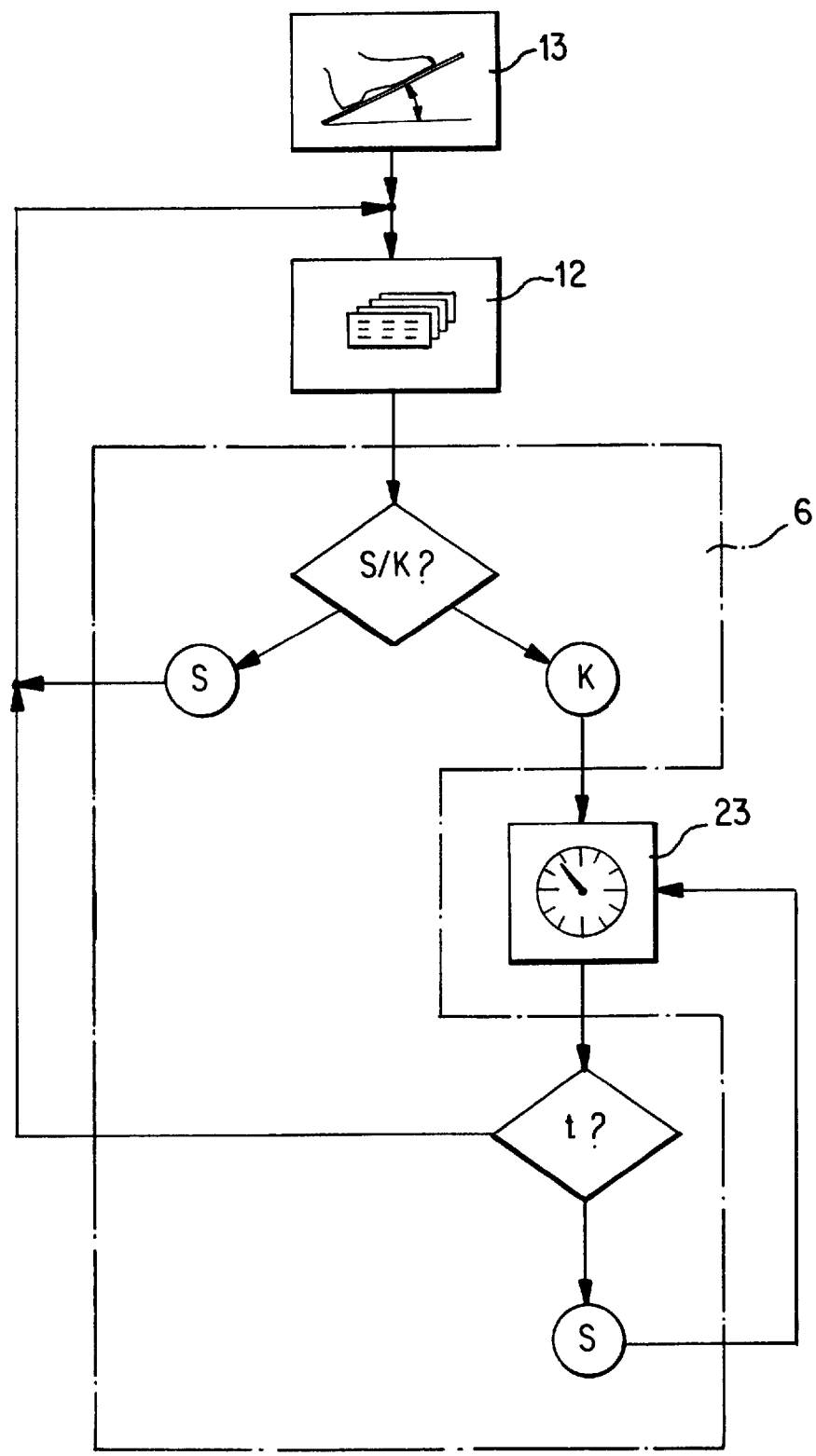
FIG. 5 is a flow chart of a control of the process for the operation of an Otto internal-combustion engine.
Figure 6:
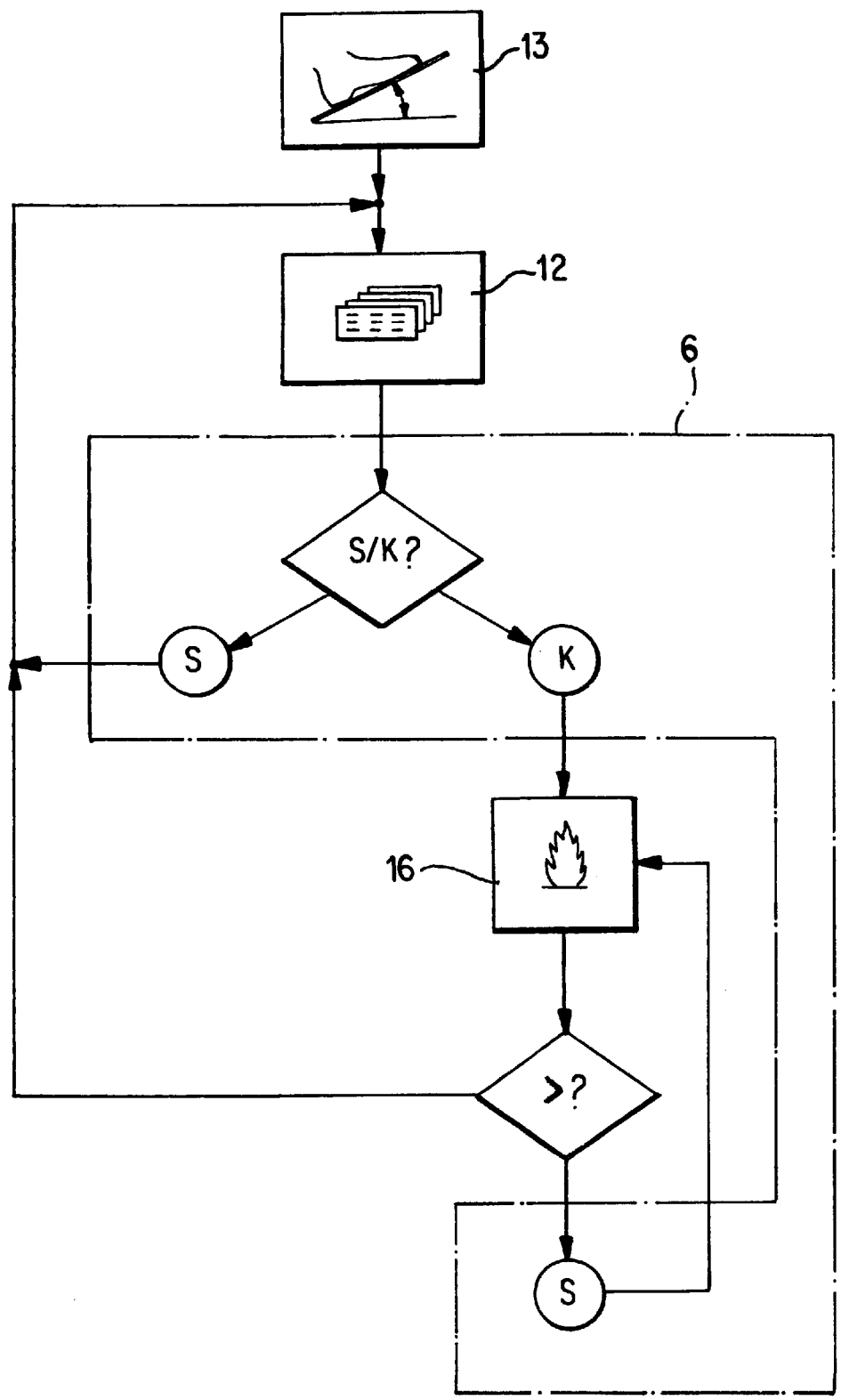
FIG. 6 is a flow chart of an alternative control of the process for the operation of an Otto internal-combustion engine.

FIGS. 5 and 6 schematically illustrate control variants of the operating process according to the invention of an Otto internal-combustion engine with an internal mixture formation. As a function of the load requirement 13, the control unit 6 decides, based on the load point data, which can be taken from a characteristic diagram 12, whether (in the case of the medium or low load requirement) the internal-combustion engine is operated with fuel injection in the compression stroke K or (in the case of the high partial load or full load) an operation with a suction stroke injection S takes place. In the event of a suction stroke injection, the control circuit is closed and a change of the operating mode takes place in the event of a changed load requirement 13. If the internal-combustion engine is operated at a lower or medium load requirement 13 with a compression stroke injection K, an input signal is continuously supplied to the control unit 6 by a timer or with information concerning operating parameters of the internal-combustion engine. If the supplied input signal meets a certain criterion, which is determined by a parameter taken from the characteristic diagram 12 and indicates an excessive influencing of the operating behavior by the deposits formed in the case of the compression stroke injection in the combustion space of the internal-combustion engine, according to the invention, a change-over takes place to the suction stroke injection S. As described above, in the case of the suction stroke injection and a homogeneous mixture formation while the load point is maintained, a higher average combustion space temperature is reached and the formed deposits are burnt without residues.

FIG. 5 illustrates the control of the operating process of an Otto internal-combustion engine with an internal mixture formation according to the arrangement in FIG. 1. The input signal for the control unit 6 is in this case generated by a timer 23. The operating interval with the compression stroke injection K is limited with respect to time and, after a certain operating time t, a change-over takes place to the suction stroke injection S for the free-burning. The duration t of the operating interval with the compression stroke injection is fixed by a parameter which can be taken from the characteristic diagram 12 and which is in each case assigned to the load requirement 13. If the control unit 6 determines that the elapsed operating time t is shorter than the maximal operating time in the compression injection operation known from the characteristic diagram 12, the control circuit is closed. A change of the operating mode takes place only if either the load requirement 13 is changed or the input signal generated by the timer 23 corresponds to the parameter known from the characteristic diagram; that is, that the maximally possible operating interval with the compression stroke injection F has taken place without any damaging disturbance of the operating conditions of the internal-combustion engine as a result of deposits in the combustion space. If, after the conclusion of the known operating interval, the control unit 6 switches over to the suction stroke injection S, the free-burning interval is terminated after the reaching of the interval duration measured by the timer 23 with the maximal free-burning interval duration known from the characteristic diagram 12 and the control circuit is closed.

FIG. 6 is a schematic view of the control of the operating process of internal-combustion engines with an internal mixture formation according to the arrangements in FIGS. 2 and 3. If, as a function of the load requirement 13, the control unit 6 lets the internal-combustion engine operate with the compression stroke injection K, the control unit 6 receives an input signal 16 with information on the momentary combustion quality. If the combustion quality deteriorates because of excessive deposits and coking in the combustion space to a certain extent known on the basis of the parameter taken from the characteristic diagram 12, the control unit 6 switches for a short time for a certain free-burning interval to the suction stroke injection S. In this case, the input signal 16 according to the arrangement indicated in FIG. 2, can be determined from a rotating time measurement on a rotating flywheel of the internal-combustion engine. In this case, an excessive fluctuation indicates cycle fluctuations as a result of a coking of the spark plugs so that a change-over becomes necessary to the suction stroke injection and a free-burning because of increased combustion space temperatures with a homogeneous mixture formation. However, as an alternative, the input signal 16 according to FIG. 3 can also be determined directly from a testing current measurement after the application of a testing voltage to a spark plug by the ignition system in the case of an a spark plug diagnosis with respect to coking.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Process for operating an Otto internal-combustion engine having one injector respectively per cylinder for the internal mixture formation, said process comprising the steps of:

a) changing the point in time and the injection quantity of the respective fuel injection as a function of load requirement of the internal-combustion engine by means of an electronic control unit, and b) injecting the required fuel quantity at a full load or high partial load in the suction stroke and at a medium or low partial load in the compression stroke of the piston into the cylinder, wherein in the operation of the internal-combustion engine with a compression stroke injection, as a function of the time or at least one operating parameter, the control unit changes over, independently of the momentary load requirement, to the suction stroke injection with a simultaneous reduction of the intake air quantity and, after the conclusion of a certain free-burning interval, switches back into the operating mode with the compression stroke injection.

2. Process according to claim 1, wherein the control unit receives an input signal determined from an operating parameter and, in the event of a conformity with a predeterminable parameter, the change-over takes place to the suction stroke injection and, after the conclusion of the free-burning interval, the switching-back takes place.

3. Process according to claim 2, wherein the control unit takes from a characteristic diagram the parameters for the momentary load point of the internal-combustion engine stored there.

4. Process according to claim 2, wherein the input signal is generated by a timer and the change-over of the operating mode in each case takes place after the conclusion of an interval determined by the parameter.

5. Process according to claim 3, wherein the input signal is generated by a timer and the change-over of the operating mode in each case takes place after the conclusion of an interval determined by the parameter.

6. Process according to claim 2, wherein the input signal is determined from an operating parameter of the internal-combustion engine with information on the momentary combustion quality.

7. Process according to claim 3, wherein the input signal is determined from an operating parameter of the internal-combustion engine with information on the momentary combustion quality.

8. Process according to claim 6, wherein the quiet running of the internal-combustion engine is determined as the input signal.

9. Process according to claim 8, wherein for determining the quiet running of the internal-combustion engine, a rotating-time measurement is carried out on a rotating flywheel of the internal-combustion engine and, when a certain fluctuation is reached, the change-over of the operating mode takes place.

10. Process according to claim 9, wherein the free-burning interval is limited with respect to time by an input signal generated by a timer.

11. Process according to claim 6, wherein a testing voltage is applied to spark plugs projecting into the cylinders, between whose electrodes at the point in time of the ignition, after the application of an ignition voltage, an ignition spark for the mixture ignition sparks over, during a testing interval away from the point in time of the ignition, and a testing current, which flows through the spark plug, is measured as an input signal for the control unit, and the change-over of the operating mode takes place when a testing current is reached which is determined by the parameter.

12. Process according to claim 11, wherein the testing voltage applied to the spark plugs is clearly lower than the breakthrough voltage required for generating an ignition spark.

13. Process according to claim 11, wherein the testing voltage is applied before the ignition voltage.

14. Process according to claim 12, wherein the testing voltage is applied before the ignition voltage.

15. Process according to claim 11, wherein the measurement of the testing current on each spark plug takes place individually and approximately in the same crank angle area during the respective working play of the cylinders.

16. Process according to claim 12, wherein the measurement of the testing current on each spark plug takes place individually and approximately in the same crank angle area during the respective working play of the cylinders.

17. Process according to claim 13, wherein the measurement of the testing current on each spark plug takes place individually and approximately in the same crank angle area during the respective working play of the cylinders.

18. Process according to claim 11, wherein the testing voltage amounts to 5 V to 10 V.

19. Process according to claim 13, wherein the testing voltage is applied during the exhaust stroke of the piston.

20. Process according to claim 14, wherein the testing voltage is applied during the exhaust stroke of the piston.

* * * * *